Patented Feb. 17, 1931

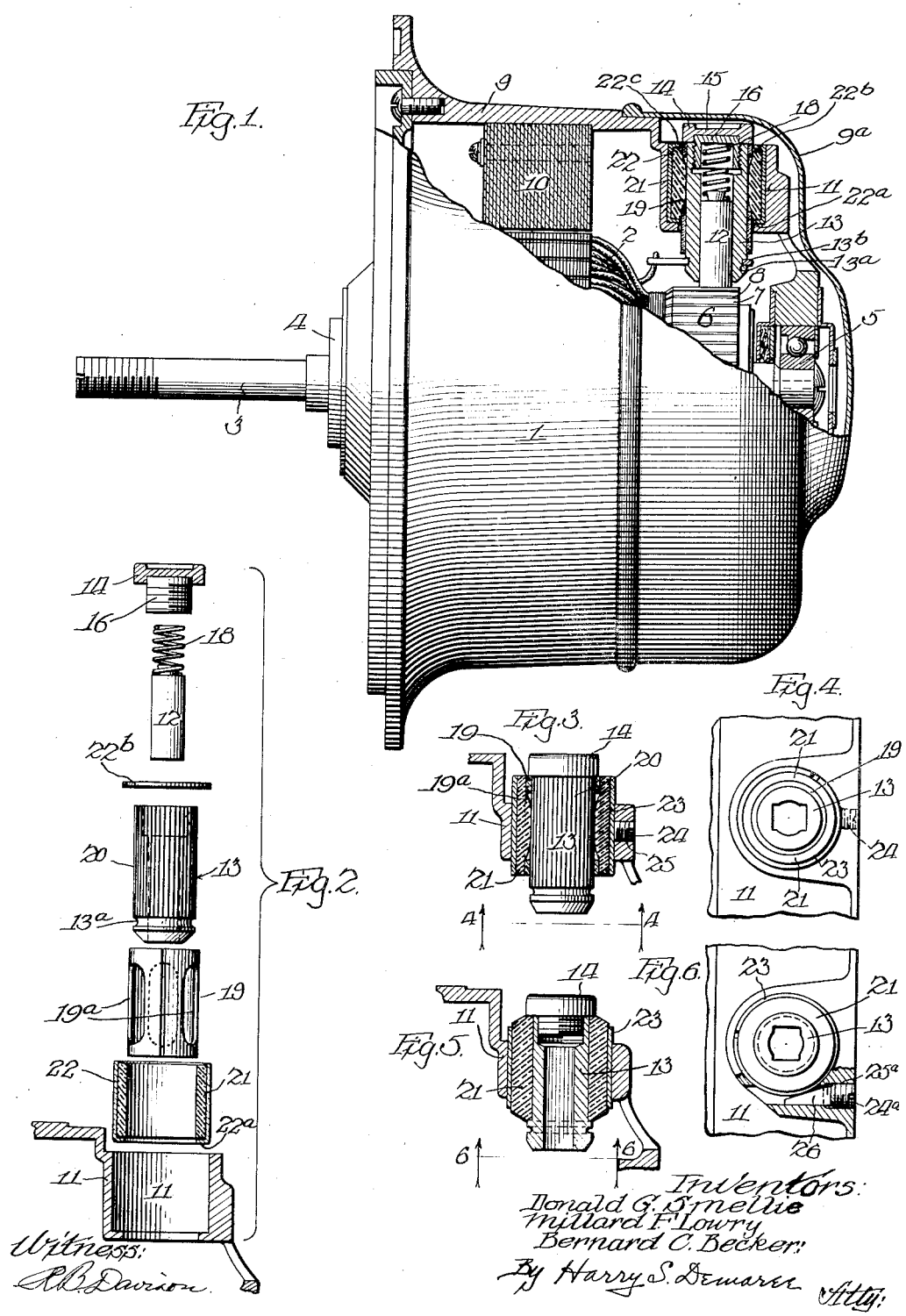

1,793,258

UNITED STATES PATENT OFFICE

DONALD G. SMELLIE, MILLARD F. LOWRY, AND BERNARD C. BECKER, OF CANTON, OHIO, ASSIGNORS TO THE HOOVER COMPANY, A CORPORATION OF OHIO

ELECTRIC MOTOR

Application filed September 3, 1929. Serial No. 389,909.

This invention relates to electric motors or generators and more particularly to supporting means for the commutator brushes used in electric motors or generators. It is the primary object of the present invention to provide a brush holder so constructed that, during the operation of the machine in which it is embodied, no unnecessary noises will emanate therefrom. It is a further object to provide a brush mounting for electric motors and generators in which the brush is mounted in such a manner that resonant noises resulting from high frequency vibrations are eliminated. Other and more specific objects will appear from reading the following specification and consideration of the accompanying drawings.

In the drawings, in which like reference characters refer to like parts in the various views:

Fig. 1 is a side elevation, partly in section, disclosing a preferred embodiment of the present invention as applied to an electric motor.

Fig. 2 is an exploded view in elevation of the preferred embodiment of the present invention shown in Figure 1, certain of the parts being shown in section.

Fig. 3 is a view in vertical section of a structure embodying a modification of the invention.

Fig. 4 is a fragmentary sectional view taken upon the line 4—4 in Figure 3.

Fig. 5 is a view in vertical section of a still further modification of the invention; and Fig. 6 is a fragmentary sectional view taken upon the line 6—6 of Fig. 5.

Referring to Fig. 1 in particular, the present invention is shown as applied to an electric motor indicated generally by the reference character 1. The motor comprises the usual armature 2 positioned upon the motor shaft 3 which is carried by end bearings, indicated generally by the reference characters 4 and 5. Positioned adjacent the armature and carried by the motor shaft, as in the usual direct current motor or generator, is the commutator indicated by the reference character 6, which comprises commutator segments 7, 7 etc. which are separated by commutator slots 8, 8. Carried by the motor casing 9, which surrounds the motor shaft, armature, and commutator, is the motor field indicated generally by the reference character 10, and a cover 9ª is provided to fit upon the casing 9 and enclose the parts. In the motor casing 9, on opposite sides of the enclosed commutator are located sockets 11, of which only one is shown in Figure 1. Positioned within each socket 11 and secured therein in a manner embodying the present invention is a motor brush 12, through which the current for the motor passes on its way to or from the commutator and the armature. The brush 12 is shown as of rectangular cross section, and is non-rotatably and slidably mounted in the metallic holder 13, which is interiorly screw threaded at its upper end, and is formed at its lower end with an annular groove 13ª, to receive a spring clip 13ᵇ to which the lead wire is attached.

An externally threaded spring retaining member 16 is positioned within the upper threaded end of the holder 13, the retaining member 16 being preferably cup shaped to provide a spring abutment as far from the commutator as possible, and an insulating cap 14 is secured to the outer end of the member 16 in any suitable manner, being preferably of a diameter slightly greater than that of the holder 13. The brush 12 is preferably formed with a wedge-shaped projection 17 at its free end, and a compression spring 18 is provided which may be detachably secured to the brush by forcing the projection 17 into one end thereof. The spring 18 is loosely received in the holder 13 and the retaining member 16, it being apparent that the spring is compressed as the retaining member is screwed into place in the holder 13, and serves to hold the brush 12 in resilient engagement with the commutator 6.

Closely surrounding the holder 13 is a thin split sleeve 19 of stiff material having a relatively low thermal conductivity and of high insulating characteristics, the sleeve being provided with a plurality of large longitudinally extended openings 19ª. A sleeve 21 of soft rubber is also provided, of a size to snugly receive the sleeve 19, and is itself contained in a thin-walled tube 22, of brass or similar material. At its lower end, the tube or sleeve 22 is formed with an inwardly projecting annular flange 22$^a$, which substantially covers the lower end of the soft rubber sleeve 21, and a washer 22$^b$ is preferably provided having an opening of a diameter slightly greater than that of the external diameter of the insulating sleeve 19, and fitting within the upper end of the tube 22. After the brush holder 13 is assembled within the insulating sleeve 19, these parts are slid endwise into the soft rubber sleeve 21, which is then slid endwise into the tube 22. The soft rubber sleeve 21 is then compressed longitudinally by forcing the washer 22$^b$ toward the flange 22$^a$, the material of the soft rubber tube being thereby distorted to protrude through the openings 19$^a$ into contact with the knurled outer surface 20 of the holder 13, and the upper edge of the tube 22 is turned over, as shown at 22$^c$, in Fig. 1, to hold the soft rubber sleeve compressed. It will be apparent that the parts constitute a unitary assembly, the holder 13 and insulating sleeve 19 being held in place by the frictional contact of the soft rubber. In time the soft rubber will adhere to the metallic surfaces of the holder 13 and the tube 22, so that even though the soft rubber shrinks materially the holder 13 will be prevented from rotating within the tube 22. The inner edges of the flange 22$^a$ and the washer 22$^b$ are sufficiently spaced from the insulating sleeve 19 to permit slight angular movement of the holder 13 relative to the tube 22 and the socket 11 in which it is mounted by a press fit, so that vibrations cannot be transmitted from the holder 13 to the casing 9 but will be absorbed by the soft rubber, and the parts will be electrically insulated. At the same time, the life of the soft rubber is materially lengthened by reason of the fact that the area of the rubber which is exposed to the action of the air and light is reduced to a minimum.

Referring now to Figures 3 and 4 in which a modification of the present invention is disclosed, the relation between the brush and the metallic holder proper 13 is the same as in the preferred modification. The outer surface of the holder 13 is knurled as at 20 and is surrounded by the insulating sleeve 19, having openings 19$^a$ therein. The resilient rubber sleeve 21 surrounds the insulating sleeve 19 as in the preferred modification, but is not compressed longitudinally within the socket 11 as therein disclosed. Instead, the rubber sleeve 21 is surrounded by the split metal shell 23 which is acted upon by a set screw 24, which passes through a screw-threaded opening 25 in the wall of the socket 11. The action of the set screw 24 as it is screwed into the opening 25 in the socket 11 is to press against the steel shell 23 reducing the diameter thereof and resulting in the compression of the rubber sleeve 21 and the firm but resilient securing of the brush holder proper 13, the soft rubber being forced through the openings 19$^a$ into contact with the holder 13.

Referring now to Figures 5 and 6, in the modification there shown the screw-threaded opening 25$^a$ in the socket 11 is substantially tangent to the periphery of said socket and to the split metal shell 23 which is positioned therein. Positioned in the opening 25$^a$ is a wedge 26, which is acted upon by the set screw 24, to compress the shell 23 and so clamp the brush holder proper in position.

From the foregoing it will be seen that a new and novel brush holder construction has been provided which is simple in construction, and which, by the use of a sound deadening and vibration damping sleeve, eliminates the high frequency resonant noises usually resulting from the use of ordinary brush mountings.

The invention having been thus described, what is claimed is:—

1. A mounting for a commutator brush, comprising a frame, a brush, and means carried by said frame and resiliently supporting said brush comprising yielding means about said brush and opposing lateral movement of said brush in any direction.

2. A mounting for a commutator brush, comprising a frame having a socket therein, a brush within said socket, and yielding means within said socket about said brush for resiliently opposing lateral movement of said brush.

3. A mounting for a commutator brush, comprising a frame, a brush, a holder in which said brush is slidably mounted for movement toward the commutator, and means carried by said frame positioned about and resiliently supporting said brush holder against movement toward the supporting portion of said frame.

4. A mounting for a commutator brush, comprising a frame having a socket therein, a brush, and means for resiliently supporting said brush comprising a soft rubber member interposed between said brush and the wall of said socket.

5. A mounting for a commutator brush, comprising a member having a socket therein, a brush, a holder in which said brush is slidably mounted for movement toward the commutator, a bushing of insulating material surrounding said holder, and a soft rubber member interposed between said bushing and the wall of said socket.

6. A mounting for a commutator brush, comprising a holder in which said brush is slidably mounted, a tubular member surrounding said holder, a soft rubber bushing interposed between said holder and said tubular member, and means for supporting said tubular member.

7. A mounting for a commutator brush comprising a holder in which said brush is slidably mounted, a tubular member surrounding said holder, a soft rubber bushing interposed between said holder and said tubular member and held under longitudinal compression in said tubular member, and means for supporting said tubular member.

8. A mounting for a commutator brush, comprising a frame, a holder in which said brush is mounted, a soft rubber sleeve surrounding said holder, and means carried by said frame and supporting and substantially enclosing said soft rubber member.

9. A mounting for a commutator brush comprising a frame, a metallic holder in which said brush is mounted, a bushing of insulating material surrounding said holder and having an opening therein, a soft rubber member outside of said bushing, and means carried by said frame supporting said soft rubber member and holding it distorted to project through said opening into contact with said holder.

10. A mounting for a commutator brush, comprising a frame having a socket therein, a brush, a metallic holder in which said brush is mounted, a sleeve of insulating material of low thermal conductivity surrounding said holder, and resilient means interposed between said insulating sleeve and the wall of said socket.

11. A mounting for a commutator brush, comprising a frame, a brush, a metallic holder in which said brush is mounted, an insulating sleeve surrounding said holder and having an opening therethrough, a metallic sleeve, and a soft rubber sleeve between said metallic sleeve and said insulating sleeve and projecting through said opening into contact with said holder to frictionally hold said holder assembled within said metallic sleeve, and means supporting said metallic sleeve on said frame.

12. A mounting for a commutator brush, comprising a support, a brush holder carried by said support, a brush slidably carried by said brush holder, and vibration damping means positioned about said brush holder and between said brush holder and said support to damp lateral movements of said brush holder.

13. A mounting for a commutator brush, comprising a support, a tubular brush holder, a brush slidably mounted within said holder, and a vibration damping member of soft rubber under compression positioned between said holder and said support.

14. A mounting for a commutator brush, comprising supporting means having a socket therein, a brush, a metallic brush holder in which said brush is mounted, a sleeve of insulating material positioned about said holder, a soft rubber sleeve surrounding said insulating sleeve, and means secured within said socket for holding said soft rubber sleeve distorted from normal condition.

Signed at North Canton, in the county of Stark and State of Ohio, this 27th day of August A. D. 1929.
DONALD G. SMELLIE.

Signed at North Canton, in the county of Stark and State of Ohio, this 27th day of August A. D. 1929.
MILLARD F. LOWRY.

Signed at North Canton, in the county of Stark and State of Ohio, this 27th day of August A. D. 1929.
BERNARD C. BECKER.